US007648656B2

(12) United States Patent
Borrelli et al.

(10) Patent No.: US 7,648,656 B2
(45) Date of Patent: Jan. 19, 2010

(54) PROCESS OF MAKING A VISIBLE POLARIZING GLASS

(75) Inventors: Nicholas Francis Borrelli, Elmira, NY (US); George Bigelow Hares, Corning, NY (US); David John McEnroe, Corning, NY (US); Joseph Francis Schroeder, III, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/266,087

(22) Filed: Nov. 6, 2008

(65) Prior Publication Data

US 2009/0084137 A1    Apr. 2, 2009

Related U.S. Application Data

(62) Division of application No. 11/257,968, filed on Oct. 24, 2005, now Pat. No. 7,468,148.

(51) Int. Cl.
*H01B 1/00*    (2006.01)
(52) U.S. Cl. .................... 252/514; 65/30.1; 65/30.11; 65/33.1; 65/33.3; 65/435; 359/486; 359/492; 359/591; 430/13; 501/13; 501/32; 501/66; 252/520.3
(58) Field of Classification Search ............... 252/500; 65/30.1, 33.1, 435, 30.11, 33.3; 501/32, 501/13, 66; 359/492, 486, 591; 430/13
See application file for complete search history.

(56) References Cited

U.S. PATENT DOCUMENTS

| | | | |
|---|---|---|---|
| 2,319,816 A | 5/1943 | Land et al. | |
| 2,515,936 A | 7/1950 | Armistead, Jr. | |
| 3,208,860 A | 9/1965 | Armistead et al. | |
| 3,454,386 A | 7/1969 | Ernsberger | |
| 3,653,863 A | 4/1972 | Araujo et al. | |
| 3,853,568 A | 12/1974 | Chvatal | |
| 3,859,128 A | 1/1975 | Burks et al. | |
| 4,017,316 A | 4/1977 | Renkey et al. | |
| 4,057,408 A | 11/1977 | Pierson et al. | |
| 4,125,404 A | 11/1978 | Araujo et al. | |
| 4,251,278 A | 2/1981 | Hares | |

(Continued)

FOREIGN PATENT DOCUMENTS

EP    0719741    7/1996

(Continued)

OTHER PUBLICATIONS

S.D. Stookey et al; Selective Polarization of Light Due to Absorption by Small Elongated Silver Particles in Glass; Applied Optics, No. 5, vol. 7, May 1968 pp. 777-779.

*Primary Examiner*—Mark Kopec
*Assistant Examiner*—Khanh Tuan Nguyen
(74) *Attorney, Agent, or Firm*—Walter M. Douglas (57) ABSTRACT

The invention is directed to a silver-containing polarizing boroaluminosilicate glass composition that has been doped with a noble metal selected from the group consisting of Pt, Pd, Os, Ir, Rh and Ru, including mixtures thereof, to nucleate and precipitate silver ions to silver metal without the need for a reducing atmosphere step. The invention is further directed to a method for making the glass composition of the invention. Using the composition and method of the invention, one can prepare a glass having a selected null transmission range.

6 Claims, 9 Drawing Sheets

U.S. PATENT DOCUMENTS

| | | | |
|---|---|---|---|
| 4,269,813 A | 5/1981 | Klotz | |
| 4,282,022 A | 8/1981 | Lo et al. | |
| 4,304,584 A | 12/1981 | Borrelli et al. | |
| 4,479,819 A | 10/1984 | Borelli et al. | |
| 4,479,829 A | 10/1984 | Kniepkamp | |
| 4,498,919 A | 2/1985 | Mann | |
| 4,792,535 A | 12/1988 | Fine | |
| 5,045,509 A | 9/1991 | Kiefer | |
| 5,275,979 A | 1/1994 | Borrelli et al. | |
| 5,281,562 A | 1/1994 | Araujo et al. | |
| 5,300,465 A | 4/1994 | Grateau et al. | |
| 5,332,819 A | 7/1994 | Smothers | |
| 5,424,255 A | 6/1995 | Kassner | |
| 5,430,573 A | 7/1995 | Araujo et al. | |
| 5,517,356 A | 5/1996 | Araujo et al. | |
| 5,625,427 A | 4/1997 | Araujo et al. | |
| 5,627,114 A | 5/1997 | Havens et al. | |
| 5,663,109 A | 9/1997 | Dietz et al. | |
| 5,729,381 A | 3/1998 | Havens et al. | |
| 6,298,691 B1 | 10/2001 | Borrelli et al. | |
| 6,313,947 B1 * | 11/2001 | Takahashi et al. | 359/492 |
| 6,466,297 B1 | 10/2002 | Goulding et al. | |
| 6,536,236 B2 | 3/2003 | Grossman et al. | |
| 6,563,639 B1 | 5/2003 | Borrelli et al. | |
| 3,754,881 A1 | 12/2003 | Gedeon et al. | |
| 6,775,062 B2 | 8/2004 | Borrelli et al. | |
| 6,893,991 B2 | 5/2005 | Araujo et al. | |
| 2003/0064875 A1 | 4/2003 | Yamashita et al. | |
| 2003/0230113 A1 | 12/2003 | Gedeon et al. | |
| 2005/0032623 A1 | 2/2005 | Araujo et al. | |

FOREIGN PATENT DOCUMENTS

| | | |
|---|---|---|
| JP | 5-2008844 | 8/1993 |

* cited by examiner

Legend

Sample A (650 °C: ———————
Sample B (600 °C): — — — —
T: Transmission perpendicular to elongation direction
N: Transmission parallel to elongation direction

PROCESS OF MAKING A VISIBLE POLARIZING GLASS

CLAIM OF PRIORITY

This divisional application claims the priority of U.S. application Ser. No. 11/257,968, filed Oct. 24, 2005 now U.S. Pat. No. 7,468,148, entitled "Visible Polarizing Glass and Process."

FIELD OF THE INVENTION

The invention is directed to polarizing glasses and a method for making such glasses. In particular, the invention is directed to a silver-containing glass composition and a noble metal from the group consisting of platinum, palladium, osmium, iridium, rhodium and ruthenium, and a method for making the polarizing glass that does not require a reducing atmosphere step.

BACKGROUND OF THE INVENTION

A polarizing effect can be generated in glasses containing silver, copper or copper-cadmium crystals. These crystals can be precipitated in a boroaluminosilicate glasses having compositions containing suitable amounts of an indicated metal and a halogen other than fluorine.

The polarizing effect is generated in these crystal-containing glasses by stretching the glass and then exposing its surface to a reducing atmosphere, typically a hydrogen containing atmosphere. The glass is placed under stress at a temperature above the glass annealing temperature. This elongates the glass, and thereby elongates and orients the crystals. The shear stress that acts on the particles is proportional to the viscosity of the glass and the draw speed during elongation. The restoring force that opposes the deformation by the shear force is inversely proportional to the particle radius. Hence, the optimum conditions for producing a desired degree of particle elongation and a resulting polarizing effect at a given wavelength involves a complex balance of a number of properties of the glass and the redrawing process. Once the glass has been elongated, the elongated glass article is then exposed to a reducing atmosphere at a temperature above 120° C., but not over 25° C. above the glass annealing point. This develops a surface layer in which at least a portion of metal halide crystals present in the glass are reduced to elemental silver or copper.

The use of silver halide as a polarizer material capitalizes on two properties of the silver halide that are (1) the liquid particle is very deformable, and (2) it is easier to make larger and controlled particles sizes. The disadvantages of using silver halide are (1) that one cannot make polarizers that operate at wavelengths shorter than red (approximately 650 nm) because of the refractive index of the silver halide and (2) that the process required a hydrogen reduction step. It is possible to stretch silver particles in glass as described in by E. H. Land in U.S. Pat. No. 2,319,816 and later by S. D. Stookey and R. J. Araujo in *Applied Optics*, Vol. 7, No. 5 (1968), pages 777-779. However, the problems encountered are the control of particle size and distribution, especially for visible polarizer application where the aspect ratio of the particle is smalls, typically 1.5-2 to 1.

The production of polarizing glass, as is described in the patent references provided below, broadly involves the following four steps:

1. Melting a glass batch containing a source of silver, copper or copper-cadmium and a halogen other than fluorine, and forming a body from a melt;
2. Heat treating the glass body at a temperature above the glass strain point to generate halide crystals having a size in the range of 500-2000 Angstroms (Å );
3. Stressing the crystal-containing glass body at a temperature above the glass annealing point to elongate the body and thereby elongate and orient the crystals; and
4. Exposing the elongated body to a reducing atmosphere at a temperature above 250° C. to develop a reduced surface layer on the body that contains metal particles with an aspect ration of at least 2:1.

Glass polarizers, the material compositions and the methods for making the glasses and articles made from the glasses have been described in numerous United States patents. Products and compositions are described in U.S. Pat. Nos. 6,563,639, 6,466,297, 6,775,062, 5,729,381, 5,627,114, 5,625,427, 5,517,356, 5,430,573, 4,125,404 and 2,319,816, and in U.S. Patent Application Publication No. 2005/0128588. Methods for making polarizing glass compositions and or compositions containing silver, and/or articles made from polarizing or silver-containing glasses have been described in U.S. Pat. Nos. 6,536,236, 6,298,691, 4,479,819, 4,304,584, 4,282,022, 4,125,405, 4,188,214, 4,057,408, 4,017,316, and 3,653,863. Glass articles that are polarizing at infrared wavelengths have been described in U.S. Pat. Nos. 5,430,573, 5,332,819, 5,300,465, 5,281,562, 5,275,979, 5,045,509, 4,792,535, and 4,479,819; and in non-U.S. patents or patent application publications JP 5-208844 and EP 0 719 741. The Japanese patent publication describes a copper-based polarizing glass instead of a silver-based polarizing glass.

While there have been considerable efforts in the art to improve polarizing glasses and the methods used to make them, there is still considerable need for further improvement. In particular, it would be advantageous to have a glass and a method for making the glass that does not require the use of a reducing atmosphere step. While it possible to stretch silver (Ag) particles, there are very considerable problems with regard to controlling particle size and distribution. These difficulties are particularly pronounced regarding visible light polarizers where the aspect ratio is small, typically 1.5-2 to 1. Accordingly, it is the object of the present invention to provide a polarizing glass composition that does not require a reducing atmosphere step and a method for making such glass. In particular, it is an object of the present invention to provide a polarizing glass composition utilizing silver and an additional selected noble metal, wherein the additional noble metal is used to nucleate atomic silver to silver metal particles without the use of a reducing atmosphere step, and a method for making such glass.

SUMMARY OF THE INVENTION

The present invention is directed to a silver-containing polarizing boroaluminosilicate glass composition that has been doped with an additional noble metal selected from the group consisting of platinum (Pt), palladium (Pd), gold (Au), iridium (Ir), rhodium (Rh) and ruthenium (Ru), wherein the additional noble metal is used to nucleate atomic silver to form silver particles.

The invention is further directed to a silver-containing boroaluminosilicate polarizing glass composition that has been doped with platinum to thereby nucleate silver ions to form silver metal particles without requiring the use of a reducing atmosphere step or other reductants known in the art such as antimony, starch, sugar or cerium.

The invention is additionally directed to a method for making a silver-containing polarizing boroaluminosilicate glass composition containing silver and an additional selected noble metal, preferably platinum, to nucleate atomic silver to form silver particles without the use of a reducing atmosphere step.

DETAILED DESCRIPTION OF THE INVENTION

The term "noble metal", as used herein with the regard to the metal dopant added to the silver containing glass, refers to the one or more metals selected from the group consisting of platinum (Pt), palladium (Pd), gold (Au), iridium (Ir), rhodium (Rh), osmium (Os) and ruthenium (Ru). The term "noble metal" as used herein also excludes the silver contained in the glass compositions of the invention.

The method of making a polarizing article by redrawing at high stress a glass containing a silver halide ("Ag X" where X is a halogen) phase is well documented. For example, see U.S. Pat. Nos. 6,536,236, 6,298,691 and 4,304,584, and other method patents cited herein. The utility of this process, invented by Corning Incorporated, was in the recognition that it was easier to elongate the silver halide particle at the size distribution that was formed in photochromic glass than it was to elongate a silver particle in an arbitrary glass. Once the Ag halide particle was elongated, it was then reduced in a hydrogen-containing atmosphere to form the required elongated metallic silver particle. Although the direct elongation of a metallic silver particle is possible, the elongation requires a much higher stress. However, this fact does not preclude the situation where, if one finds a glass composition and a process where large silver crystals can be controllably formed, that one would not be able to reduce the stress required to provide reasonable elongation of metallic silver particles. One advantage of the direct metallic silver particle elongation process is that in the resulting product the material surrounding the silver has a lower refractive index relative to the bulk glass. This keeps the surface plasmon resonance at a shorter wavelength, which is important for making polarizers that operate in the visible portion of the spectrum.

The glass composition of the invention that has the property of controllable large silver particles is derived from the compositions used for gradient index lenses (see U.S. Pat. No. 6,893,991 B2). In gradient index lens glass compositions the glass contains a high concentration of a polarizable ion, for example, $Ag^+$ or $Cu^{2+}$, and the ion can be readily ion-exchanged. In the present invention it was important to have a glass composition retain some silver as atomic silver until it can be nucleated to metallic silver is conducted as described herein.

The silver containing aluminoborosilicate base glass composition according to the invention contains the following range of materials in weight percent [wt. %].

TABLE 1

| | |
|---|---|
| $SiO_2$ | 20-60 |
| $Al_2O_3$ | 5-20 |
| $B_2O_3$ | 10-25 |
| Ag | 15-40 |

In making the base glass composition the Si, Al and B materials can be added as oxides and Ag is added as the nitrate or as a mixture of silver nitrate and silver peroxide. Additionally, at least one noble metal salt or salt solution is added to the base glass composition and the resulting composition is mixed. The noble metal, or mixture of noble metals if more than one is used, is selected from the group consisting of platinum, palladium, gold, osmium, iridium and ruthenium salts, The noble metal, or mixture of noble metals, is present in an amount in the range of 0.0025 wt. % to 0.5 wt. % (measured as total zero-valent noble metal), preferably in an amount in the range of 0.01 to 0.3 wt. %, and it can be added as a halide, nitrate, or complex such as an acetylacetonate, oxalate or crown ether or other complex known in the art, or as a solution of any of the foregoing. In a preferred embodiment the silver containing aluminoborosilicate base glass composition according to the invention is approximately (in weight percent±2 wt. %):

TABLE 2

| | |
|---|---|
| $SiO_2$ | 34 |
| $Al_2O_3$ | 17 |
| $B_2O_3$ | 14 |
| Ag | 35 | and the noble metal is Pt in amount in the range of 0.0025 wt. % to 0.5 wt % (measured as total zero-valent noble metal), preferably in an amount in the range of 0.01 to 0.3 wt. %, and most preferably in an amount in the range of 0.02 wt. % to 0.2 wt. %

When the base glass composition alone is melted in a quartz crucible at approximately 1350° C. for approximately 16 hours, a clear, slightly yellow glass is produced. The slightly yellow color of the glass is indicates that substantially all of the silver is dissolved in the glass composition as the silver +1 ion. The glass also fluoresces under ultraviolet light indicating that at least some of the silver is present as atomic silver. Upon adding only a slight amount of a noble metal, for example, platinum, to the base glass composition the slightly yellow color of the glass turns to a deep red-brown color that is indicative of the presence of large colloidal silver particles. Small silver particles produce a yellow color whereas the large particles produce a light scattering effect in addition to the absorption. This is the appearance of a Pt-doped glass; that is the color is deeper and darker due to the light scattering effect. The level of Pt, or other noble metal(s), needed to induce this change is in the range of 0.0025 to 0.5 wt. %. Once the nucleation or formation of metallic silver has been carried out one can further increase the density of the color (that is, the amount of precipitated colloidal silver particles) by heating the glass to a temperature in the range of 500-800° C., preferably to a temperature in the range of 600-750° C. for a time in the range of 2 to 6 hours at temperature. This ability for further effect precipitation gives one additional control over the amount of silver that is present as metallic silver crystals in the glass. In addition, a further heat treatment at a temperature in the range of 500-800° C. for a time in the range of 0.5 to 6 hours enables one to grow larger silver crystals.

Once the nucleation/precipitation has been completed, the glass is than shaped prior to drawing, for example, by molding or by cutting a glass boule into a desired shape, and Blanchard ground into bars, for example bars that are 10 to 40 inches long, 3-4 inches wide by approximately 0.25 to 0.6 inch thick. To allow higher draw forces on the glass, an etching process, or a thermal treatment, or both, is used to remove or heal surface and subsurface defects that are introduced during the grinding process. When a glass surface is mechanically removed (for example by grinding), many surface and/or subsurface fractures or flaws can either result or become exposed. Under an applied stress these fractures or flaws can propagate into the glass body causing the glass to fracture. By chemically etching and/or thermally treating the glass surface the flaws are healed by rounding out the fracture (flaw) surface, or by closing it using a thermal treatment. Thermal treatments are generally carried out at a temperature near (within 25-50° C.) the softening point of the glass composition. As an example of etching, prior to drawing the glass, the glass bar is immersed in a dilute hydrofluoric acid solution for a period of time sufficient to remove a portion of the surface to remove contamination and flaws. If deemed necessary, visual inspection, with or without the use of magnification, can be used to determine when the process is completed. The glass bars are then drawn under conditions where the draw temperature allows a glass viscosity greater than $10^6$ poise and a pulling velocity that is sufficient to apply a force greater than 3500 psi (>3500 psi) to elongate the silver particles.

Figure 1:
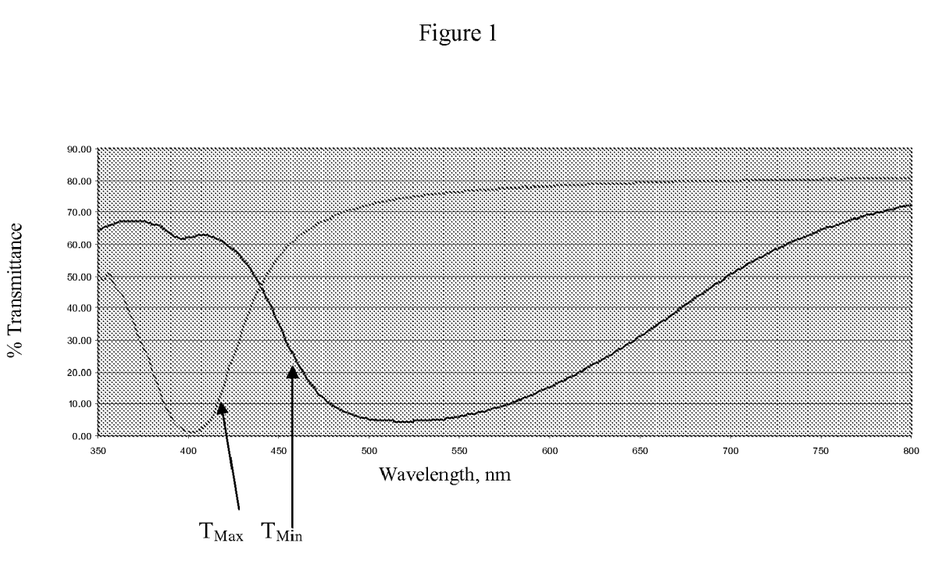
FIG. 1 illustrates the polarized transmittance spectrum of two redrawn Pt-doped glass compositions having a heat treatment at temperatures of 600 and 650° C., respectively, prior to drawing.

FIG. 1 illustrates the polarized transmittance spectrum (uncorrected for reflectance) of a redrawn Pt-doped glass having the composition given in Table 2. It was determined that at pulling velocities less than 3500 psi (<3000 psi) the elongated silver particle aspect ratio is small and therefore the null direction transmission increases at lower wavelengths. For a polarizing glass operating at lower wavelengths, for example, in the visible range, this increase in null direction transmission is undesirable. When the applied force to stretch the silver, which force is controlled by the viscosity of the glass and velocity of the draw speed, is greater than 3500 psi, a glass material with an acceptable polarizing behavior in the visible range was obtained. Further, it is preferable to apply to the drawn glass as great a force as the mechanical strength of the glass and the equipment will permit in order to achieve the desired elongation of the silver particles. The unpolished glass sample illustrated in FIG. 1 had a transmission is 60% in the pass or through direction (that is, light passing through the glass in the direction perpendicular to the direction of elongation) and essentially 0% transmission in the null or stop direction (that is, no light passing through the glass in the direction parallel to the direction of elongation).

Figure 2:
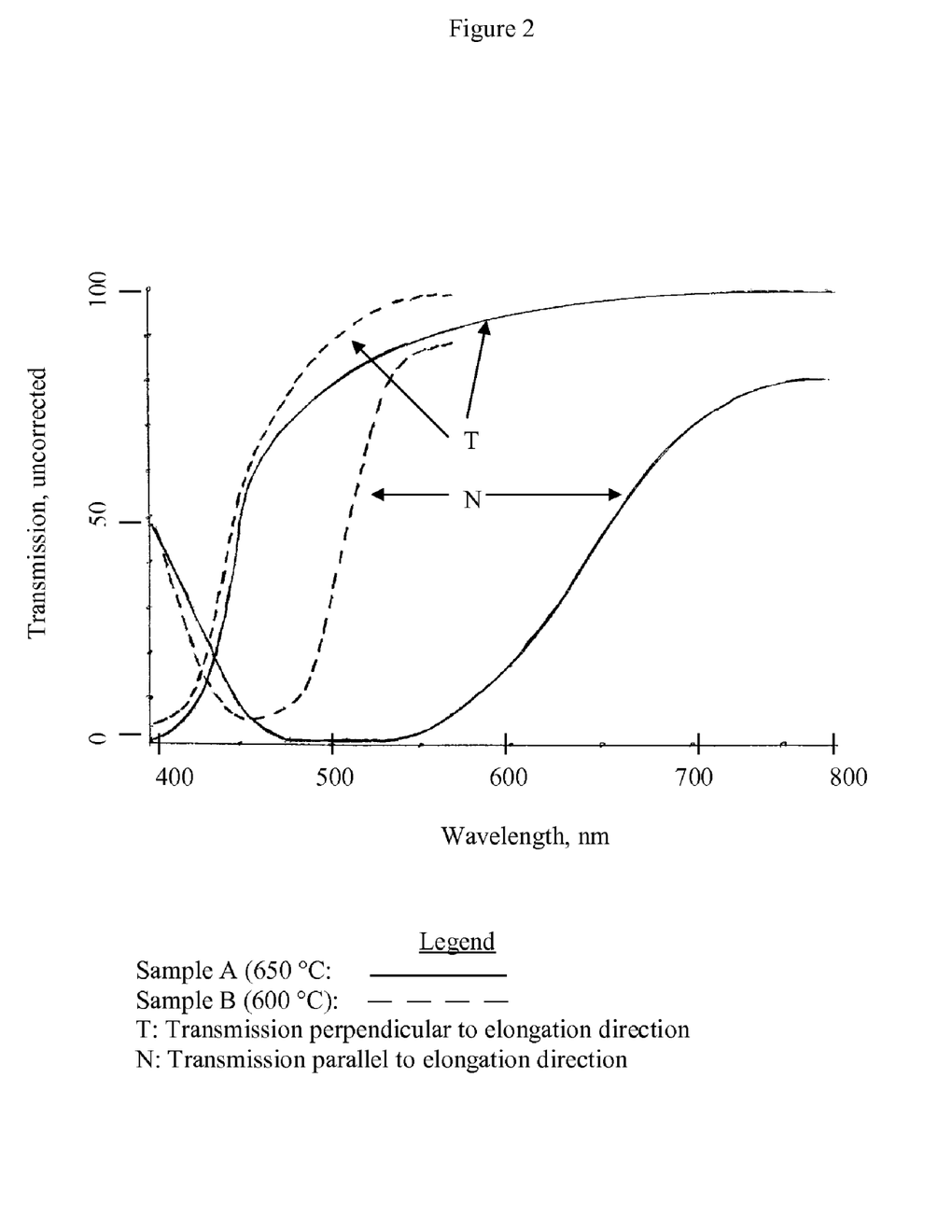
FIG. 2 illustrates transmittance in the null ("N") and through ("T") for the two glasses of FIG. 1.

FIG. 2 illustrates on a single graph the polarized transmittance spectrum (uncorrected for reflectance) in the range of 400-800 nm (visible range) of two samples of a drawn Pt-doped glass having the composition given in Table 2. Sample A (illustrated by the solid line, and which is the same as the sample as illustrated in FIG. 1), was given a pre-draw heat treatment at 650° C. and Sample B (illustrated by the dashed line) was given a per-draw heat treatment at 600° C. For each sample light transmission in the direction perpendicular (through or pass direction) and parallel (null or stop direction) to the direction of elongation of the silver particles it shown by the capital letters "T" and "N", respectively.

FIG. 2 illustrates that one can selectively determine the wavelength or wavelength range in which light will be polarized when a silver-containing glass is doped with a noble metal, heat treated and drawn in accordance with the invention to thereby elongate the silver particles therein. For Sample A, the glass composition was heat treated at 650° C. prior to drawing. As one can see from the graph, transmittance in the null direction (N) direction is essentially zero in the range of approximately 475-550 nm. Sample B, which is the same glass composition as Sample A, was heat treated at 600° C. prior to drawing. For this sample the transmittance in the null direction is below 10 in the approximate range of 425-480 nm. For both glass sample transmittance in the through ("T") direction are similar through the range measured. This comparison illustrates the aspect of the invention which is that by use of a noble metal in a silver containing glass, one can tailor the null range of the glass by appropriate heat treatment prior to drawing the glass. As a result, one is able to form a glass that selectively polarized a selected wavelength range. As shown in FIG. 2, by controlling the heat treatment one can determine the performance of a glass at a given wavelength by regulating the silver particle size. In FIG. 2, the further the null peaks are shifted to the right. The shift of the null peak represents better elongation of the particles or greater aspect ratio, and based on the assumption that larger particles are easier to elongate, it is concluded that the particles in the glass are larger. Thus, the curves also show that when a glass is heat treated at lower temperatures we have smaller particles that are more difficult to elongate during draw.

A further advantage of the glass according to the invention that when stretched it has both good transmission and contrast values at 535 nm (green polarizer application). Moreover, these values are attained without the need for hydrogen or other reducing atmosphere treatment. The Pt-doped glass according to the invention represents a totally new glass composition for polarizer applications.

Figure 3:
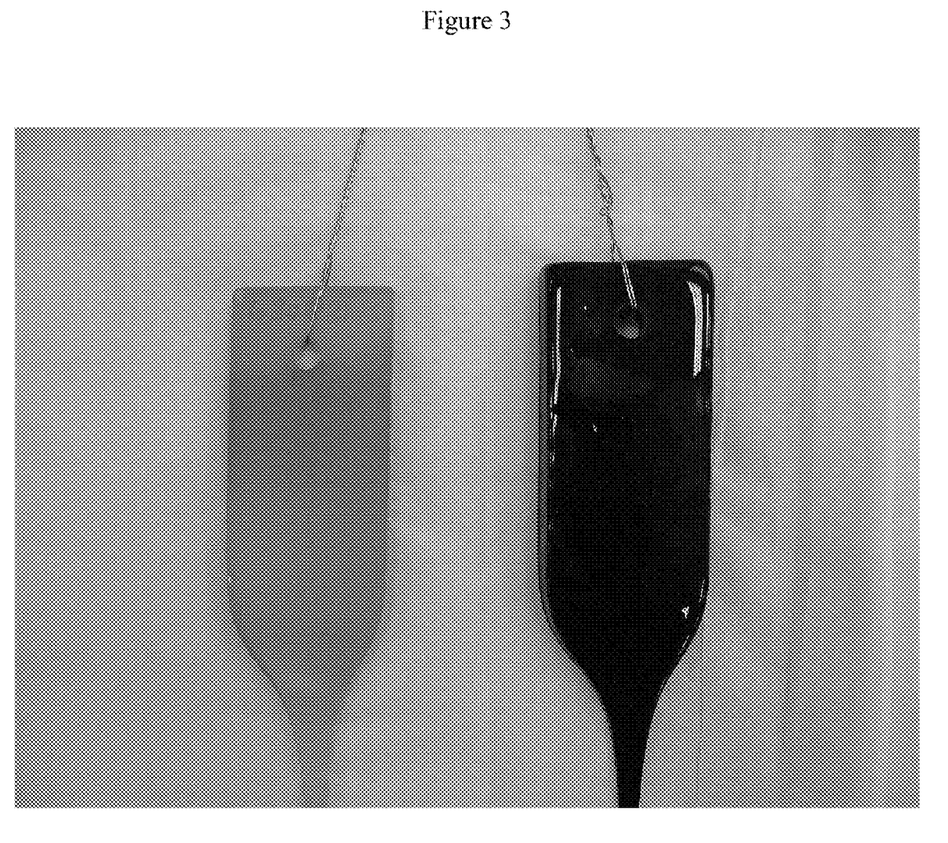
FIG. 3 illustrates visible light polarizer bars that have been drawn, with a finished bar on the right and an as-poured bar on the left.
Figure 5:
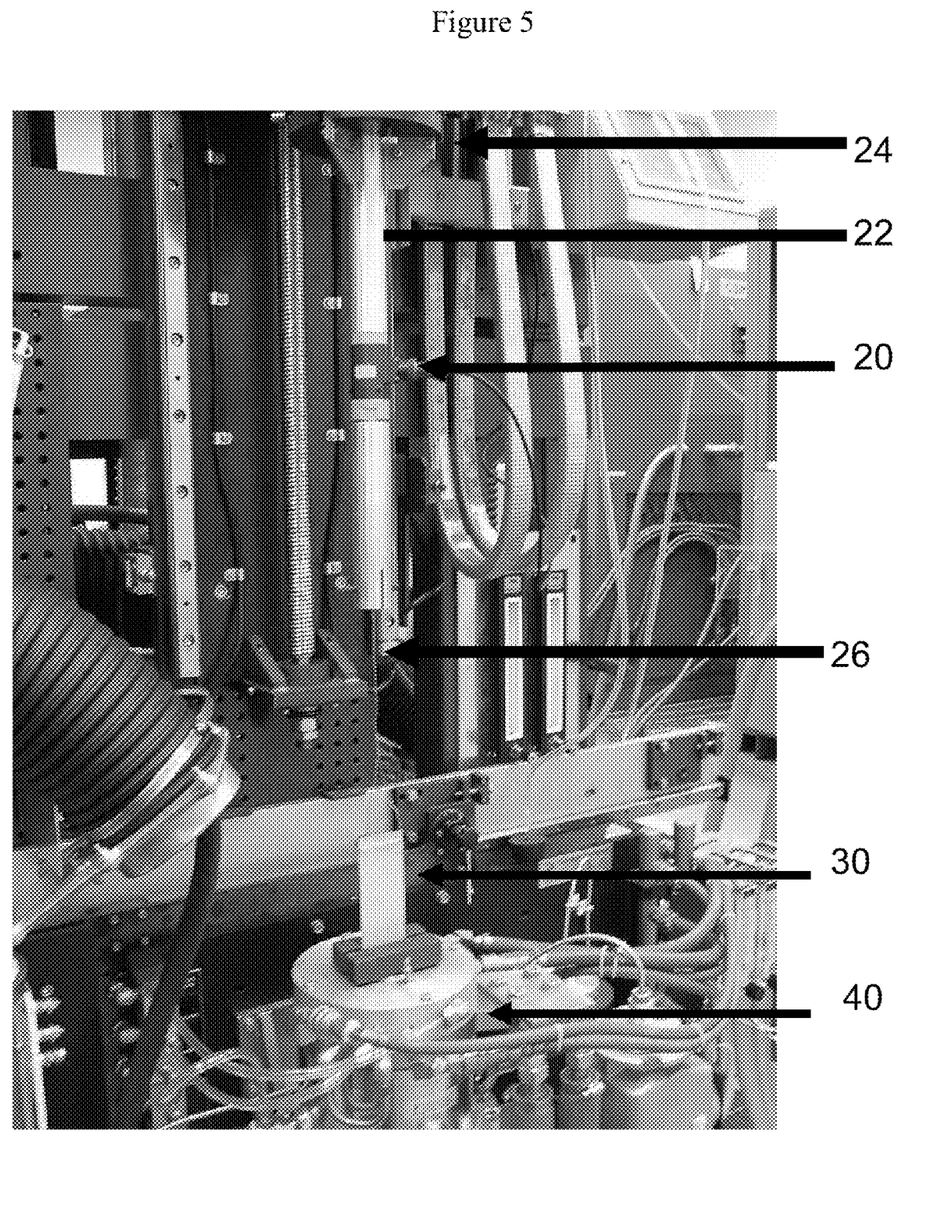
FIG. 5 illustrates a furnace, load cell and glass bar suspended in the furnace.

The process according to the invention was developed to allow a high through put of different glass compositions in order to investigate their potential for polarization applications using a redraw technique. The AMPL (for Corning's Advanced Material Processing Laboratory) draw tower (purchased from Heathway Ltd, now Herbert Arnold GmbH & Co. KG, Weilburg, Germany) as shown in FIG. 5 is comprised of a downfeed system, furnace 40 and pulling tractors (not illustrated) that were used to stretch-down glass bars under high tension. Various glass compositions were melted in a crucible then poured into a bar form using a mold. The bars were then either machined finished or used as-poured in the drawing process (see FIGS. 2 and 3, described below). For the testing described herein, the bars 30 are approximately 2 inches wide by 10 to 40 inches long, and were of varying thicknesses ranging from 0.25 to 0.60 inches. Holes were drilled on each end of the bars (see FIG. 3 illustrating one end of a bar); one hole being used to hang the bar from a metal cylinder 22 on the downfeed system and the other hole was used to grasp the bar to start the drawing process. A load cell 20 was attached to a metal cylinder 22 that was held in the place in the downfeed chuck 24 and the other end of the load cell supported the glass bar. The furnace 40 was a graphite resistance furnace that can span a wide temperature range. The furnace was controlled using a pyrometer and programmable controller. The glass bar was suspended in the furnace by a wire 26 connected to the metal cylinder 22 plus load cell 20 as shown in FIG. 5.

After placing the bar in the furnace, the furnace temperature was raised to a temperature at which the glass was soft enough to enable pull-down. For the platinum-doped glass of the invention a temperature of 725° C. was used for drawing the glass. Once the glass was initially pulled down, the downfeed which lowers the glass bar into the furnace at a controlled rate was started. The feed rate of lowering the glass down was set at 13 mm/min. The tractor unit is comprised of two motor driven belts (located below the furnace) opposing each other and rotating in opposite directions so that the motion through the belts is downward. The distance between the belts can be set so that the glass being drawn through can be grasped by the belts and does not slip in the belts.

Figure 4:
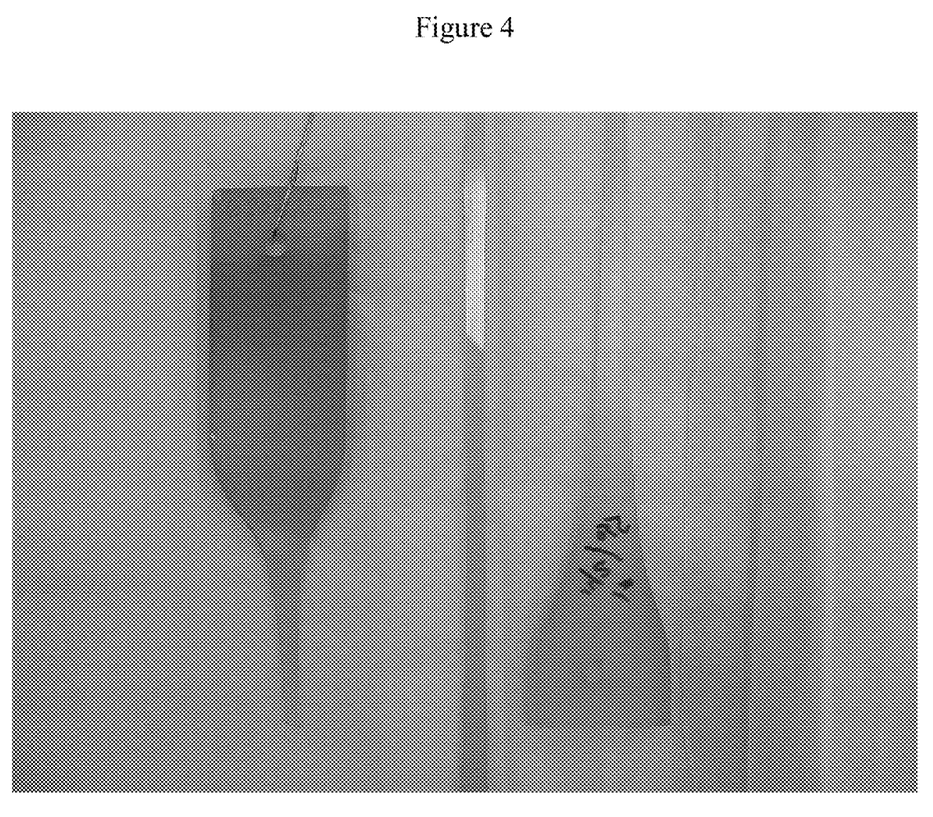
FIG. 4 illustrates a glass bar after drawing on right, drawn glass ribbon in the middle and a root or gob of glass from start-up.

FIG. 3 illustrates visible polarizer bars that have been drawn as described above. The bar on the left, colored a light yellow, is a bar as-poured that was drawn without the addition of a noble metal and the bar at the right, dark reddish-brown, is a finished bar containing noble metal and drawn as described herein. FIG. 4 illustrates a glass bar on the right, a drawn glass ribbon in the middle, and a root or gob of glass on the bottom of the bar from start-up. When the bottom portion of the glass bar is drawn down it is a large gob (root) and has to be hand drawn down through the tractor unit, which is approximately two feet below the furnace bottom. Once the root of glass is passed through the tractor belts the smaller ribbon of glass is placed in between the belts and the belts closed so that they are pulling the glass (see FIG. 5). The tractor belt speed is then set to a rate that is pulling the glass ribbon down to a specific size. For the platinum doped glass of the invention, a tractor speed of 2.04 m/minute was used. The ribbon can vary in size until all the draw parameters stabilize. In the example shown in FIG. 4 the final size of the ribbon was approximately 3.5 mm (0.138 in.) by 0.50 mm (0.02 in.).

The purpose of the draw is to induce a tensional force to stretch the polarizing component in the glass, which is usually accomplished at high tensions. The load cell records the force being applied on the glass bar as it is being pulled down by the tractor belts. The load being applied on the glass can be adjusted by changing temperature, downfeed rate or tractor speed. Typically, at the start of the draw the load is small and incremental adjustments, typically by changing temperature, are made to increase the tension on the glass. Sometimes several adjustments are required before a high enough tension is present on the glass. If the load is too great, the ribbon of glass will break and the start up process has to be repeated. Once a high load is achieved, the glass ribbon is marked, the draw parameter(s) recorded, and the ribbon saved. The ribbon geometry is also recorded in order to calculate the force per area applied on that particular piece of glass.

Figure 6:
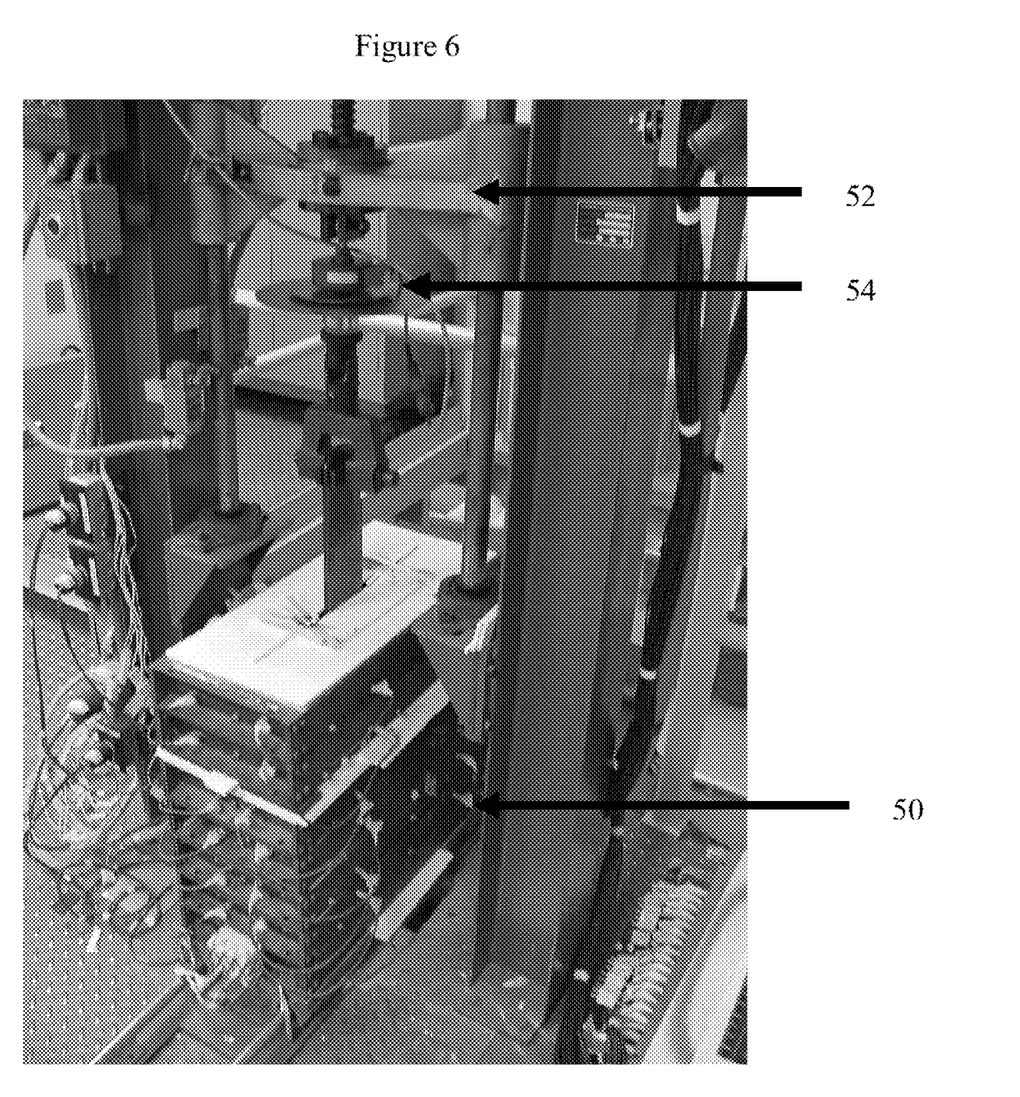
FIG. 6 illustrates an alternative furnace, load cell, down-feed and glass bar suspended in the furnace.
Figure 7:
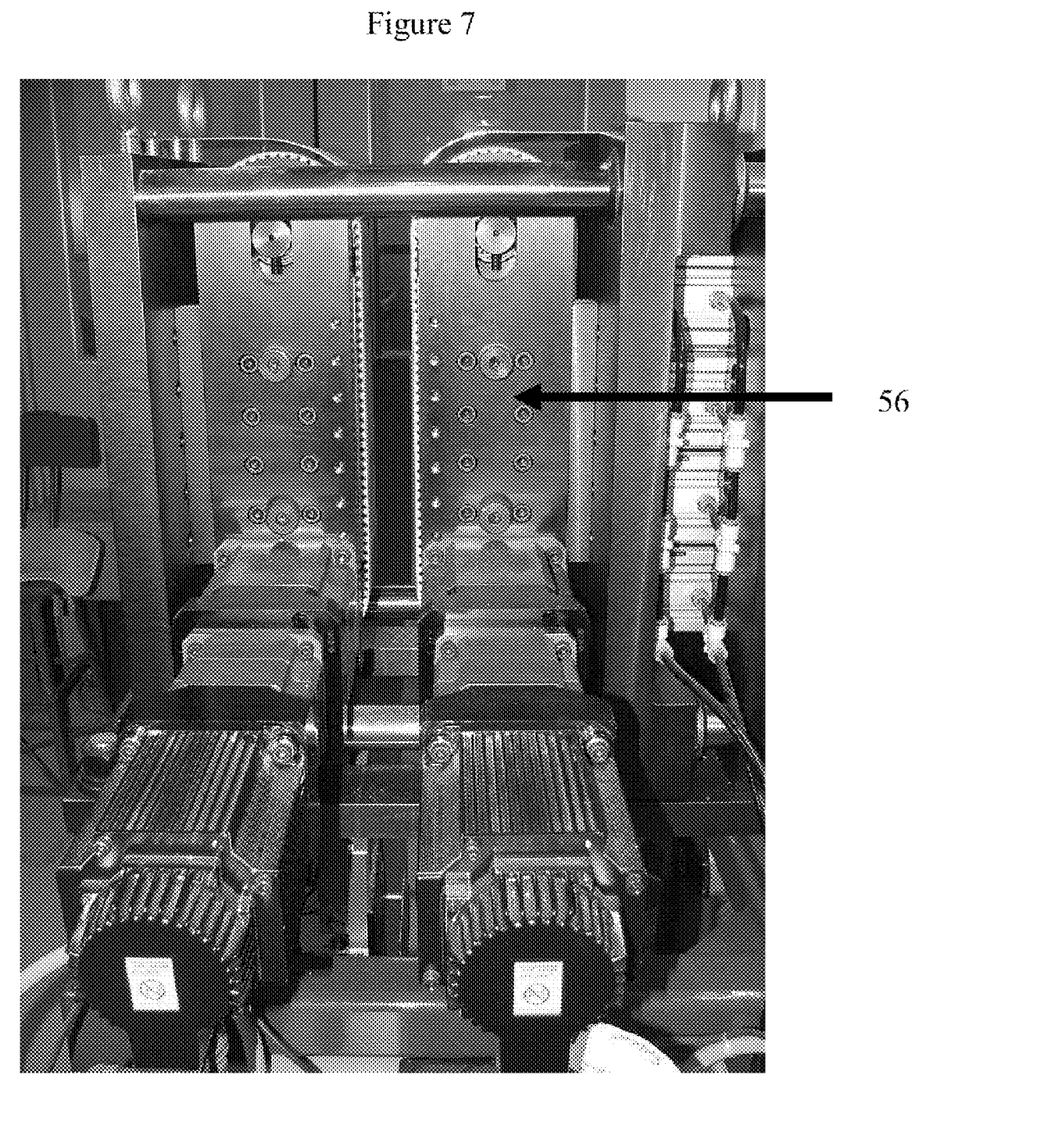
FIG. 7 illustrates the pulling device (tractor) system of the alternative furnace as used in attenuating the glass down during the draw.

A second draw apparatus (the PRC draw apparatus) was used for further development of the silver based polarizing glass which had been used on Polarcor™ development. This draw consists of a seven zone rectangular furnace 50, a downfeed system 52, load cell 54 (see FIG. 6) and a tractor pulling unit 56 (see FIG. 7). FIGS. 6 and 7 illustrate the PRC draw system which is similar to the AMPL system with regard to processing, except that the furnace and tractor are not incorporated on a tower structure. The other major difference between the two draw systems is the seven zone furnace on the PRC system. This allows tighter control of the temperatures and the ability to adjust different zones to provide the thermal profile best for drawing.

Figure 8:
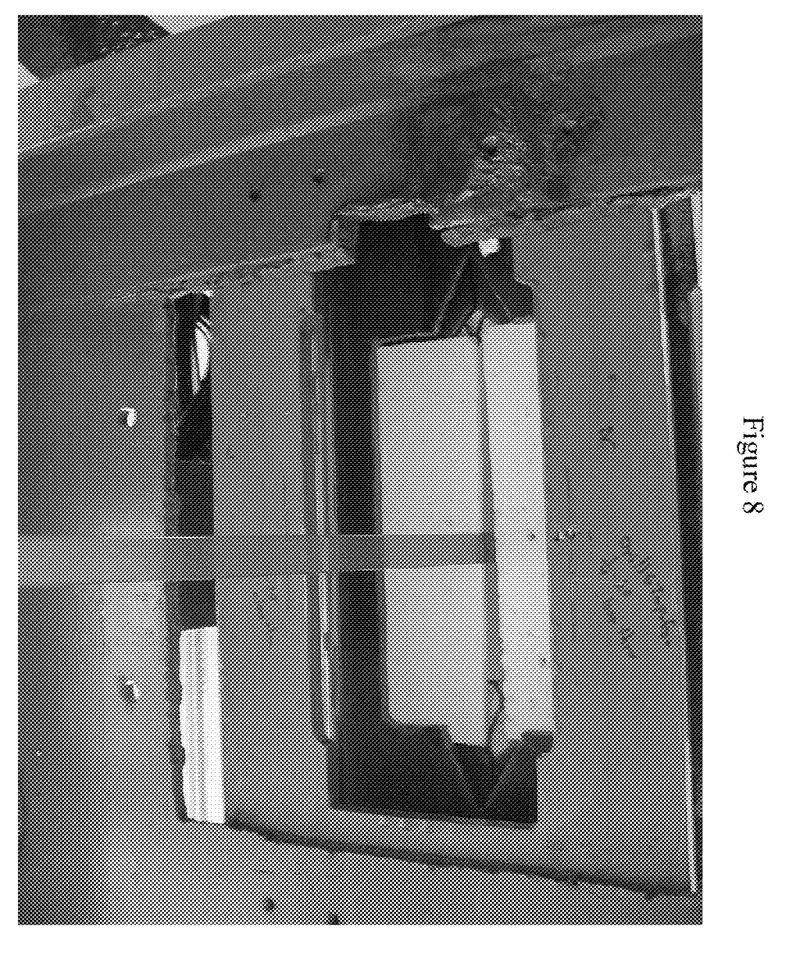
FIG. 8 illustrates a ribbon of glass exiting the alternative furnace and being drawn down.

The two benefits the PRC draw is the ability to draw larger (wider) bars resulting in wider ribbon and the tractor unit allows greater pulling stresses to be applied to the glass. FIG. 8 shows a picture of the ribbon exiting out of the furnace above the pulling tractor unit. The tractor incorporates wider and longer belts to provide more surface area in contact with the ribbon which eliminates slippage in the tractor.

The procedure for drawing the glass on the PRC draw is the same as described above with the AMPL draw. The draw parameters for the PRC system that resulted in good polarizing ribbon were in the range of 6 to 8 inch/min. draw speed and a temperature between 620° C. to 650° C. The resulting ribbon geometry is on the order of 15 to 20 mm wide and 0.8 to 1.3 mm thick. Samples were collected during the draw along with the load and draw parameters and then analyzed in a spectrophotometer.

Figure 9:
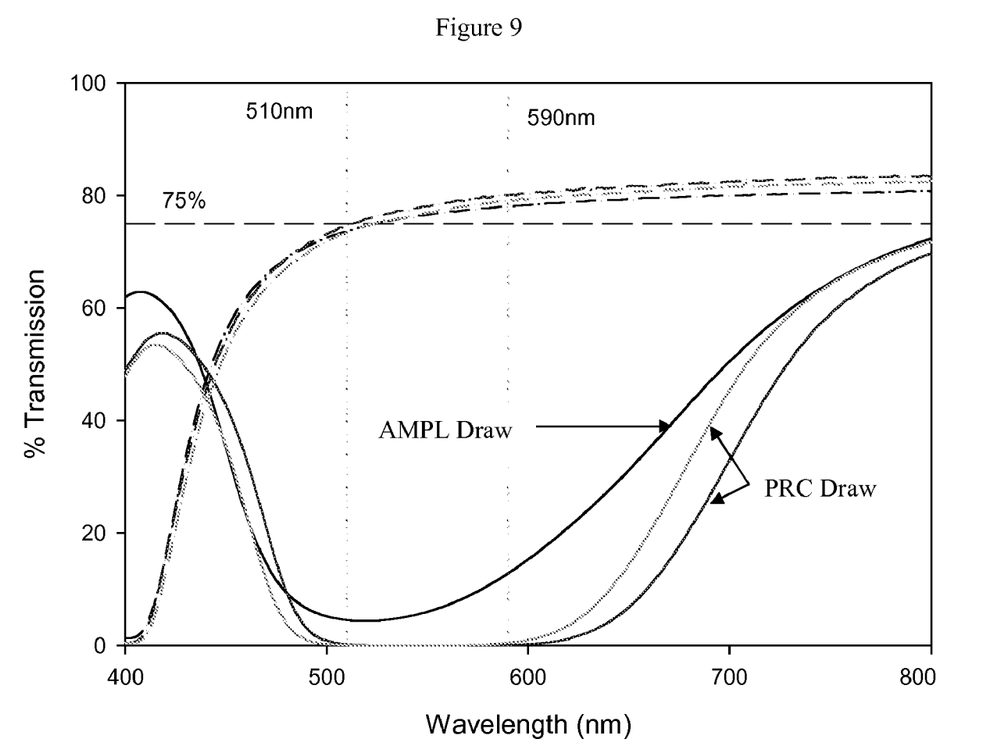
FIG. 9 illustrates a comparison of polarized transmittance of redrawn ribbon from the two different drawing systems.

Results from the PRC draw are shown in FIG. 9 compared to a result from the AMPL draw. It is seen that the Null curve is broader and has a steeper slope at longer wavelengths. This correlates to the PRC draw system ability to apply higher stress and elongating the silver particles to greater extent. This result provides a wider polarization wavelength window and a greater contrast ratio.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A method of making a polarizing glass composition, said method comprising the steps of:

preparing a base glass having a composition comprising 20-60 wt. % $SiO_2$, 12-20 wt. % $Al_2O_3$, 10-25 wt. % $B_2O_3$, and 15-40 wt. % Ag;

adding to the above composition at least one noble metal salt selected from the group consisting of Pt, Pd, Rh, Au, Os, Ir and Ru salts, said noble metal salt being added in an amount in the range of 0.0025 wt. % to 0.5 wt. % measured as zero valent metal;

mixing the components and then melting them in a manner to achieve a glass having a viscosity less than $10^3$ poise;

forming the glass into a suitable shape that allows stretching of the encapsulated silver particles in the glass matrix;

thermally conditioning the formed glass to remove residual stress;

finishing the formed glass to a selected geometry and at least one of chemically and thermally treating the surface of the formed glass to remove or cure flaws or contaminants on the surface, the subsurface, or the surface and subsurface of the glass;

suspending the glass in a furnace heated to a temperature such that the viscosity of the glass is in the range of $10^6$ to $10^8$ poise, said suspension being in a manner such that the suspended glass can be drawn;

controlling the furnace temperature, downfeed rate and the pulling speed during draw such that an applied force greater than 3500 psi is used to elongate the silver particles; and drawing the glass under an applied force to thereby attenuate the size of glass form and induce stress in the glass to thereby stretch the silver particles within said glass.

2. The method according to claim 1, wherein the silver is added to the base glass composition as silver nitrate or a mixture of silver nitrate and silver peroxide.

3. The method according to claim 1, wherein the noble metal salt is added as a halide, a nitrate, or a noble metal complex, or as a solution of any of the foregoing.

4. The method according to claim 3, wherein the noble metal salt is added as a nitrate or halide.

5. The method according to claim 1, wherein the glass has a color and the density of the color is further increased by heating the glass to a temperature in a range of 500-800° C. for a time in the range of 0.2 to 2.0 hours.

6. The method according to claim 1, wherein, optionally, said glass is subjected to an additional thermal treatment to promote silver particulate growth, said thermal treatment being at a temperature in the range of 600 to 700° C.

* * * * *